United States Patent [19]

Heldt

[11] 4,279,451

[45] Jul. 21, 1981

[54] DEVICE FOR OBTAINING AXIAL MOBILITY AND AVOIDING RADIAL PLAY OF A BEARING RING IN RELATION TO A BEARING SEAT

[75] Inventor: Helge Heldt, Partille, Sweden

[73] Assignee: Aktiebolaget SKF, Goteborg, Sweden

[21] Appl. No.: 98,682

[22] Filed: Nov. 29, 1979

[30] Foreign Application Priority Data

Dec. 19, 1978 [SE] Sweden ................................. 7813014

[51] Int. Cl.³ ............................................. F16C 27/04
[52] U.S. Cl. ................................. 308/26; 308/184 R
[58] Field of Search ................. 308/26, 184 R, 207 A, 308/236, 189 A, 207R, 184 A, 216, 189 R

[56] References Cited

U.S. PATENT DOCUMENTS

| 643,890 | 2/1900 | Burnouf | 308/207 A |
| 921,442 | 5/1909 | Newmann | 308/207 A |
| 3,940,192 | 2/1976 | Hägele | 308/189 A |
| 4,085,984 | 4/1978 | Cameron | 308/207 A |

Primary Examiner—Lenard A. Footland
Attorney, Agent, or Firm—Eugene E. Renz, Jr.

[57] ABSTRACT

The invention relates to a device for obtaining axial mobility and for avoiding radial play of a bearing ring in relation to a bearing seat. The device comprises an elastically deformable ring with a cylindrical surface and a tapered surface co-operating with corresponding surfaces on the bearing seat and the bearing ring. The elastic ring is pressed axially on the tapered surface so that it is deformed and radial play between bearing ring and bearing seat is eliminated.

3 Claims, 1 Drawing Figure

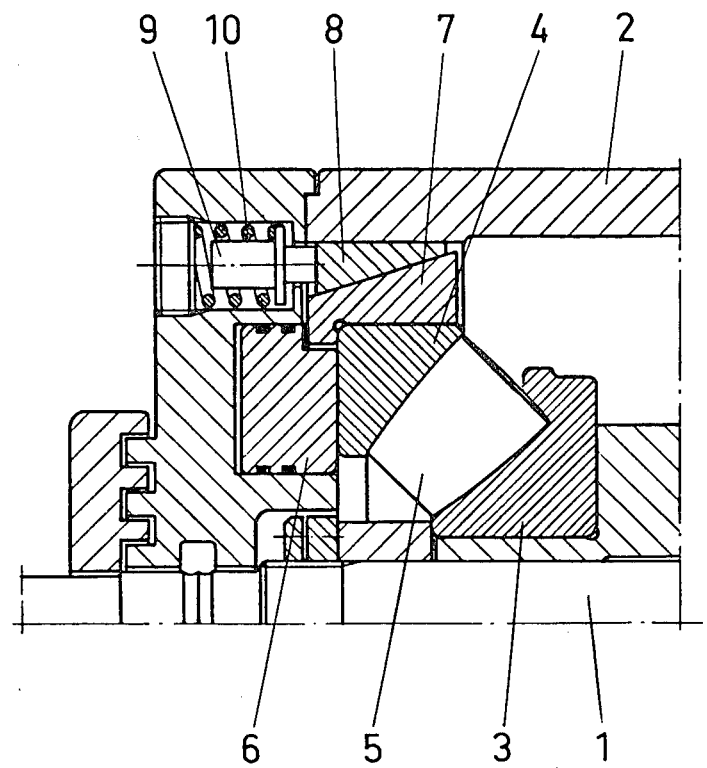

DEVICE FOR OBTAINING AXIAL MOBILITY AND AVOIDING RADIAL PLAY OF A BEARING RING IN RELATION TO A BEARING SEAT

BACKGROUND AND SUMMARY OF THE INVENTION

When a bearing ring is subjected to a rotating radial load it tends to rotate relative to its seat. This phenomenon may cause wear and corrosion with ensuing problems. Therefore it is desirable that this rotation be avoided. The most common method of avoiding rotation is to give the bearing ring a tight fit relative to the seat. However, it is not possible to use this method when the bearing ring has to be axially movable in relation to the seat. Therewith it is previously known to use a sleeve with a tight fit on the bearing ring and a loose fit against the bearing seat, and provide e.g. a wedge and wedge grooves in the sleeve and the seat in order to prevent rotation but allow axial displacement of the sleeve relative to the seat. The loose fit makes rotating load cause wear in the sleeve and the bearing seat due to "rubbing" and in some cases fails to give the desired stability in the bearing application.

The purpose of the present invention is to provide a device which gives to a bearing ring a fit without radial play relative to the seat, but maintains the axial mobility, so that a desired stability in the bearing application is secured and undesired wear is avoided.

According to the invention this is achieved by giving the device the characterizing features stated in the accompanying claim 1.

BRIEF DESCRIPTION OF THE DRAWING

In the following the invention will be closer described with reference to the attached drawing, which shows a section of a bearing application provided with a device according to an embodiment of the invention.

DESCRIPTION OF THE PREFERRED EMBODIMENT

A shaft 1 is mounted in a housing 2 in a bearing application comprising a rolling bearing with two coaxial bearing rings 3, 4 and a number of rolling bodies 5 provided between the rings. The shaft 1 is to be axially movable in relation to the housing 2. In order to ensure this, and also to ensure that the rolling bearing is always axially loaded, which is important for a thrust roller bearing, a pressure medium actuated annular piston is arranged to be pressed axially against the bearing ring 4.

A sleeve 7 with a tapered outer surface is fixed, e.g. with a tight fit, on the bearing ring 4. An outer sleeve 8 with a tapered bore corresponding to the outer surface of the sleeve 7 is arranged to enclose the sleeve 7. The sleeve 8 has a cylindrical outer surface facing the cylindrical seat in the housing 2 in order to allow axial displacement of the sleeve in the housing 2 together with the sleeve 7, the bearing 3, 4, 5 and the shaft 1. The sleeve 8 is elastically deformable and consists suitably of a slit metal body having such dimensions that a certain play exists between the cylindrical surfaces on the sleeve and the seat when the sleeve is not axially loaded.

Members in the form of pins 9, axially loaded by springs 10, press the sleeve along the tapered surface of the sleeve 7 so that the sleeve 8 expands until play is eliminated in relation to the bearing seat in the housing 2. The cone angle and the coefficient of friction of the tapered surfaces are chosen so that self-locking will not occur. The axial spring force on the sleeve 8 is adapted with regard to the axial force component which is transmitted via the tapered surface on the sleeve 7 due to the radial load taken up by the bearing, and to the friction between the sleeve 8 and the seat in the housing 2, so that the friction and the spring force do not appreciably prevent the axial mobility of the sleeve 8 in the housing 2.

In a friction contact of steel against steel, the coefficient of friction is certainly less than 0.18. If half the cone angle is at least 24° it is ensured that self-locking is avoided.

Further, the following equation applies:

$$F_F = F_r \mu^2 \cdot \tan\alpha$$

where
$F_F$ = the least spring force which has to act axially on the sleeve 8
$F_R$ = the radial force taken up by the bearing
$\mu$ = the coefficient of friction in the contact surfaces of the sleeves, and
$\alpha$ = half the cone angle in the tapered surfaces of the sleeves.

If $\mu = 0.18$ and $\alpha = 24°$, then $F_F = 1.44 \cdot 10^{-2} \cdot F_r$.

The invention is not limited to the above described embodiment, but also other embodiments are thinkable. For example, the bearing can be any kind of bearing with ability of taking up radial as well as axial loads. Instead of contacting a sleeve 7, the sleeve 8 can contact a tapered surface provided directly in the ring 4. The spring force on the sleeve 8 can be directed in the opposite direction if the cone angle of the taper is reversed. Thereby, however, the contribution of the spring force to the axial prestressing of the bearing obtained in the embodiment according to the FIGURE is eliminated. The axial force on the sleeve 8 can also be provided with for example hydraulic or pneumatic means. It is also possible to make the inner ring axially displaceable instead of the outer ring, for example if the outer ring is rotating and the inner ring is arranged on a fixed stub axle. Therewith the sleeves are of course situated between the inner bearing ring and the stub axle, and axial force exerting members are arranged in connection thereto.

The spring loaded sleeve may have a cylindrical bore and a tapered outer surface co-operating with a tapered seat, whereby the bearing is axially displaceable in relation to the sleeve.

I claim:

1. A device for obtaining axial mobility and avoiding radial play of a bearing ring in relation to a bearing seat, characterized by that it comprises an elastically deformable annular member (8) with a cylindrical surface facing a corresponding cylindrical surface in connection to the bearing seat or the bearing ring, and a tapered surface contacting a corresponding tapered surface in connection to the bearing or the bearing seat, and members (9, 10) for urging said annular member axially on the last mentioned surface, thereby deforming said annular member until play is eliminated and a light contact pressure is established in relation to the bearing seat or the bearing, the cone angle and the coefficient of friction of said tapered surfaces being such that self-locking is avoided in the tapered contact.

2. A device according to claim 1, characterized by that the annular member consists of a slit metal body (8).

3. A device according to claim 1 or 2, characterized by that the surface facing the tapered surface on said elastically deformable annular member is provided on a separate ring (7).

* * * * *